(No Model.)
J. GODFREY.
FIRE ESCAPE.
No. 273,722. Patented Mar. 13, 1883.
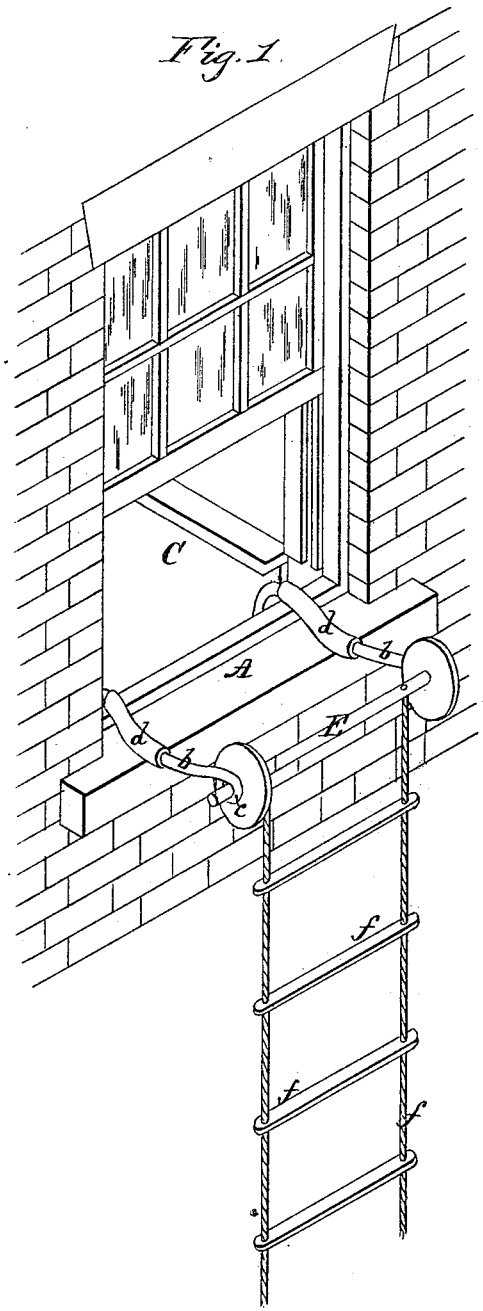
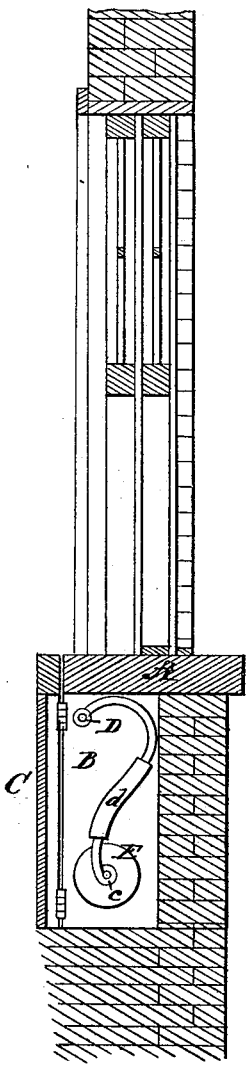
WITNESSES.
James Godfrey,
By Connolly Bros & McTighe
ATTORNEYS.

UNITED STATES PATENT OFFICE.

JAMES GODFREY, OF PITTSBURG, PENNSYLVANIA.

FIRE-ESCAPE.

SPECIFICATION forming part of Letters Patent No. 273,722, dated March 13, 1883.

Application filed November 21, 1882. (No model.)

*To all whom it may concern:*

Be it known that I, JAMES GODFREY, of Pittsburg, in the county of Allegheny and State of Pennsylvania, have invented certain new and useful Improvements in Fire-Escapes; and I do hereby declare that the following is a full, clear, and exact description of the invention, which will enable others skilled in the art to which it appertains to make and use the same, reference being had to the accompanying drawings, which form a part of this specification, in which—

Figure 1 is a perspective view of a window with the escape in position for use; Fig. 2, a sectional view of a window-frame, showing the escape stowed away in a recess beneath the window.

My invention has relation to fire-escapes; and it consists in a ladder, of rope or other equivalent flexible material, wound upon a reel having bearings in the ends of two bent rods, which are secured to a cross-bar pivoted in a recess in the window-seat, the whole being so arranged that the rods may be swung out over the window-frame and the ladder allowed to unwind when desired, thus affording a convenient means of descent from the window to the ground.

Referring to the accompanying drawings, A represents the lower portion of a window-frame. B is a recess in the wall beneath the frame A, and C a hinged door, by means of which access may be had to the recess B. Within the recess B, and immediately below the window-frame, a cross-bar, D, is placed. This bar has bearings in the side walls of recess B, and has attached to it two curved rods, $b\ b$, which have eyes $c\ c$ at their other end to receive the shaft of a reel, E. A flexible ladder, $f$, of rope or other equivalent material, is secured to the reel E, and is of such length that it will reach to the ground when unwound from the reel. The rods $b\ b$ are curved around over the window-frame, and project out therefrom a sufficient distance to allow the reel to clear the wall of the building, and they are provided with elastic cushions $d$ on that portion which comes in contact with the window-frame, the object of such cushions being to prevent injury to the rods when the reel is thrown over the window-frame, as in practicing the use of the device the hasty swinging of the device into operative position might otherwise bend the rods, or in very cold weather cause them to break off.

The operation of my invention is as follows: When not desired for use the ladder is rolled up tightly upon the reel and swung back into the recess B, the door C is closed, and the window-seat presents the ordinary appearance, no unsightly fixtures are in view, and the building is undefaced. When desired for use the door C is opened and the reel containing the ladder is swung around until it projects out through the window, the rods $b\ b$ resting upon the frame and the ladder $f$ allowed to unwind itself from the reel, thus affording an easy and convenient means of descent to the ground.

It will be seen that the operation is simple and rapid. There are no catches or fastenings to undo, and the entire apparatus is of but slight cost, while perfectly adapted to its purpose.

The recess in which the escape is contained when not in use may be formed during the construction of the building, or the escape may be contained in a box fitted to the window-seat of the ordinary form.

I have described my invention as applied to a window having a recess in the wall, beneath the frame, for the reception of the reel and flexible ladder; but such recess may be dispensed with, if desired, and the reel and swinging bars may be allowed to hang down beneath the window and without being concealed from view, in which case the cross-bar D would be supported on suitable brackets projecting from the wall or the window-frame.

Having described my invention, I claim—

1. A fire-escape consisting of a flexible ladder attached permanently at one end to a reel journaled at its ends in and supported by curved or bent rods, the latter pivoted directly to the window-recess and adapted to swing said reel and ladder out to clear the window-frame, while said rods rest directly upon the frame of the window, substantially as described.

2. The combination of the flexible ladder $f$ and reel E with the curved or bent rods $b$ and cross-bar D, said rods $b$ being directly pivoted in the window seat A, and forming the sole support of the ladder and reel, substantially as described.

3. In combination with the ladder $f$ and its reel E, the pivoted supporting-rods $b\ b$, forming the end bearings of said reel and adapted to rest upon the window-frame when in use, and the elastic cushions $d\ d$ on said rods, situated at such point as comes in contact with the window-frame, substantially as described.

In testimony that I claim the foregoing as my own I have hereto affixed my signature in presence of two witnesses.

JAMES GODFREY.

Witnesses:
  JOS. B. CONNOLLY,
  HENRY HUNNESHAGEN.